(12) United States Patent
Druegemoeller et al.

(10) Patent No.: US 9,267,623 B2
(45) Date of Patent: Feb. 23, 2016

(54) DEVICE FOR PROVIDING AN ELECTRICAL OR FLUID JUNCTION

(71) Applicants: Andreas Druegemoeller, Dittelbrunn (DE); Hans Peter Panzer, Lörrach (DE); Martin Voegelin, Hölstein (CH)

(72) Inventors: Andreas Druegemoeller, Dittelbrunn (DE); Hans Peter Panzer, Lörrach (DE); Martin Voegelin, Hölstein (CH)

(73) Assignee: AKTIEBOLAGET SKF, Gothenburg (SE)

( * ) Notice: Subject to any disclaimer, the term of this patent is extended or adjusted under 35 U.S.C. 154(b) by 57 days.

(21) Appl. No.: 14/019,883

(22) Filed: Sep. 6, 2013

(65) Prior Publication Data

US 2014/0061394 A1 Mar. 6, 2014

(30) Foreign Application Priority Data

Sep. 6, 2012 (DE) .................. 10 2012 215 851

(51) Int. Cl.
| | |
|---|---|
| *F16M 11/02* | (2006.01) |
| *F16L 3/12* | (2006.01) |
| *A47B 9/00* | (2006.01) |
| *A47B 9/20* | (2006.01) |
| *A61G 13/10* | (2006.01) |
| *A61G 12/00* | (2006.01) |

(52) U.S. Cl.
CPC ... *F16L 3/12* (2013.01); *A47B 9/00* (2013.01); *A47B 9/20* (2013.01); *A61G 12/002* (2013.01); *A61G 13/107* (2013.01); *A47B 2200/0059* (2013.01)

(58) Field of Classification Search
USPC ............... 248/56, 219.2; 138/92, 109; 256/10
See application file for complete search history.

(56) References Cited

U.S. PATENT DOCUMENTS

| | | | | | |
|---|---|---|---|---|---|
| 971,226 | A | * | 9/1910 | Turner | 248/219.2 |
| 4,111,107 | A | * | 9/1978 | Engleke | 454/45 |
| 4,560,827 | A | * | 12/1985 | Langlie et al. | 174/50 |
| 4,568,808 | A | * | 2/1986 | Thuries et al. | 200/48 V |
| 4,905,941 | A | * | 3/1990 | Feldberg | 248/63 |
| 4,915,336 | A | * | 4/1990 | Handy | 248/222.11 |
| 5,224,429 | A | * | 7/1993 | Borgman et al. | 108/147 |
| 5,301,229 | A | * | 4/1994 | Raynor | 379/143 |
| 5,667,188 | A | * | 9/1997 | Bettinsoli | 248/558 |
| 6,116,284 | A | * | 9/2000 | Murray et al. | 138/39 |
| 6,181,299 | B1 | * | 1/2001 | Frederick et al. | 345/2.1 |
| 6,585,221 | B1 | * | 7/2003 | Gretz | 248/545 |
| 6,742,748 | B1 | * | 6/2004 | Gretz | 248/156 |
| 6,743,981 | B2 | * | 6/2004 | Miyakoshi | 174/668 |
| 6,867,371 | B2 | * | 3/2005 | Daoud et al. | 174/652 |
| 6,915,992 | B1 | * | 7/2005 | Gretz | 248/156 |
| 7,977,585 | B2 | * | 7/2011 | Yoshizawa et al. | 174/659 |
| 8,061,666 | B1 | * | 11/2011 | Fortin et al. | 248/219.1 |
| 8,387,927 | B1 | * | 3/2013 | Medlin, Jr. | 248/68.1 |

(Continued)

FOREIGN PATENT DOCUMENTS

| | | |
|---|---|---|
| DE | 102010046769 A1 | 3/2012 |
| WO | 2011063812 A2 | 6/2011 |

*Primary Examiner* — Bradley Duckworth
(74) *Attorney, Agent, or Firm* — Bryan Peckjian; SKF USA Inc. Patent Dept.

(57) ABSTRACT

A device for providing an electrical or fluid junction includes a connecting structure such as a plate that it is connectable with an end of a columnar component having a hollow profile, and a junction structure such as a housing that is connected to the connecting structure and that includes at least one opening for providing an electrical or fluid junction for an external plug and a further opening for routing a line from the electrical junction into the columnar component.

18 Claims, 3 Drawing Sheets

(56) References Cited

U.S. PATENT DOCUMENTS

| | | | |
|---|---|---|---|
| 8,439,322 B2* | 5/2013 | Skudin et al. | 248/317 |
| 2005/0016806 A1* | 1/2005 | Klinke | 188/371 |
| 2006/0054451 A1* | 3/2006 | Klinke | 192/223.4 |
| 2006/0279143 A1* | 12/2006 | Platz et al. | 310/51 |
| 2009/0071271 A1* | 3/2009 | Nielsen et al. | 74/89.2 |
| 2011/0120582 A1* | 5/2011 | Veillette | 138/109 |
| 2011/0303262 A1* | 12/2011 | Wolter | 136/251 |
| 2013/0015300 A1* | 1/2013 | Klinke | 248/49 |

* cited by examiner

DEVICE FOR PROVIDING AN ELECTRICAL OR FLUID JUNCTION

CROSS-REFERENCE

This application claims priority to German patent application no. 10 2012 215 851.0 filed on Sep. 6, 2012, the contents of which are fully incorporated herein by reference.

FIELD OF THE INVENTION

Embodiments of the present invention are directed to a device for providing one or more electrical or fluid junctions (connections) for a structure, and more specifically, to a device for providing one or more electrical or fluid junctions for column-shaped components like lifting columns that having hollow profiles.

BACKGROUND

Lifting columns, which may sometimes be referred to as telescopic columns or telescopic actuators, are used in a wide variety of medical devices, for example, in wheelchairs, examination tables, patient beds, and medical equipment. They are also used outside the medical field, for example, in industrial applications for facilitating movement of machine parts or other components along a direction of movement.

It is known to run lines (electrical lines or fluid lines), wires, conduits, etc. in the interior of columnar structures like table legs, supporting columns, and lifting columns, which structures may be referred to here interchangeably hereinafter by the words "column" and "columnar component." It is thus often desirable to provide electrical or fluid junctions for these columns to connect lines outside the column to lines inside the column. These junctions may comprise, for example, a plug, or other electrical junction, on a side of the column, and these plugs may be integrated into the hollow profile section of the column. Adding plugs or other connectors to a column generally requires a post-processing or machining of the column, and this increases the complexity of the production process. Furthermore, the configuration of each plug must be specified at the time the column is ordered. In other words, in known systems, plugs which are to be accessible from the side of a column are integrated into the profile of the column when made. This means that the hollow profile section must be adapted or modified for each specific use. After the column is completed, it may be difficult for impossible to add or remove plugs, junctions or connectors to/from a column.

It would therefore be desirable to provide an arrangement that increases the design flexibility of columns with electrical or fluid junctions.

SUMMARY

A device for providing an electrical or fluid junction according to an exemplary embodiment comprises a connecting structure and a junction structure. The connecting structure is formed such that it is connectable to an end of a column or columnar component having a hollow profile. Furthermore, the junction structure is connected to the connecting structure and has at least one opening for providing an electrical or fluid junction for an external plug and a further opening for guiding an electrical or fluid line from the electrical or fluid junction into the column.

A device for providing an electrical or fluid junction according to an exemplary embodiment is based on the recognition that it is possible, in a simple manner, to attach a junction structure to one or both ends of a columnar component via a connecting structure on the columnar component. This offers the possibility of providing any number and type of electrical or fluid junction possibilities via the junction structure. Regardless of the type and number of electrical or fluid junction possibilities, the columnar component can, for example, always have the same appearance, and thus does not require different manufacturing processes as would be required in order to integrate junctions into a tube-shaped part of a column. Furthermore, the interior of the column can be reached in a simple manner via the routing opening with the line leading away from the electrical or fluid junction on the end of the column in order to further guide the line in the interior of the column in a manner that is not externally visible.

A device for providing an electrical or fluid junction based on the principle described above can be disposed on one or both ends of the column and can have any number and any type of electrical or fluid junctions. This arrangement provides a high degree of design flexibility for providing electrical or fluid junctions in columnar components. In addition, embodiments of the invention provide a more uniform manufacturing process which may reduce manufacturing costs for columnar components.

One or more additional electrical or fluid junctions (e.g. sockets or plugs) can be added as accessories to the column by a device based on the described concept. Such accessories can also be added after the manufacturing process of the column on both sides (ends) of the column. The device for providing an electrical or fluid junction (or, in short, junction device) can also be ordered by the user if a junction is needed during the service life of the column, that is, long after the manufacturing of the column is complete.

In some exemplary embodiments, the connecting structure is substantially plate-shaped, and is connected to the junction structure via a part of an edge of the plate. The junction structure extends only into one of two half-cavities defined by a plate plane of the connecting structure which faces away from the columnar component so that no part of the device protrudes into the half-cavity facing away from the columnar component. Thus the connecting structure can form a flat end of the columnar component so that a tabletop or another component to be carried/supported by the column can be attached to the column on this end without the device for providing the electrical or fluid junction being in the way.

In some further exemplary embodiments, the connecting structure has at least partially angled edges so that the device, when mounted on the column, is held in its position on the end of the column in at least one direction of movement by the angled edges. For example, the assembly can be greatly simplified by the angled edges. Alternatively, the device can also be positioned using pins or similar in openings of an end part.

Some exemplary embodiments relate to a lifting column including a device for providing an electrical or fluid junction based on the described concept. The lifting column corresponds here to the columnar component having a hollow profile, and the device is connected to an end of the lifting column via the connecting structure so that the junction structure is located on a side surface of the lifting column and extends towards the other end of the lifting column.

BRIEF DESCRIPTION OF THE DRAWINGS

Some exemplary embodiments are described in more detail below with reference to the accompanying Figures.

DETAILED DESCRIPTION

Figure 1:
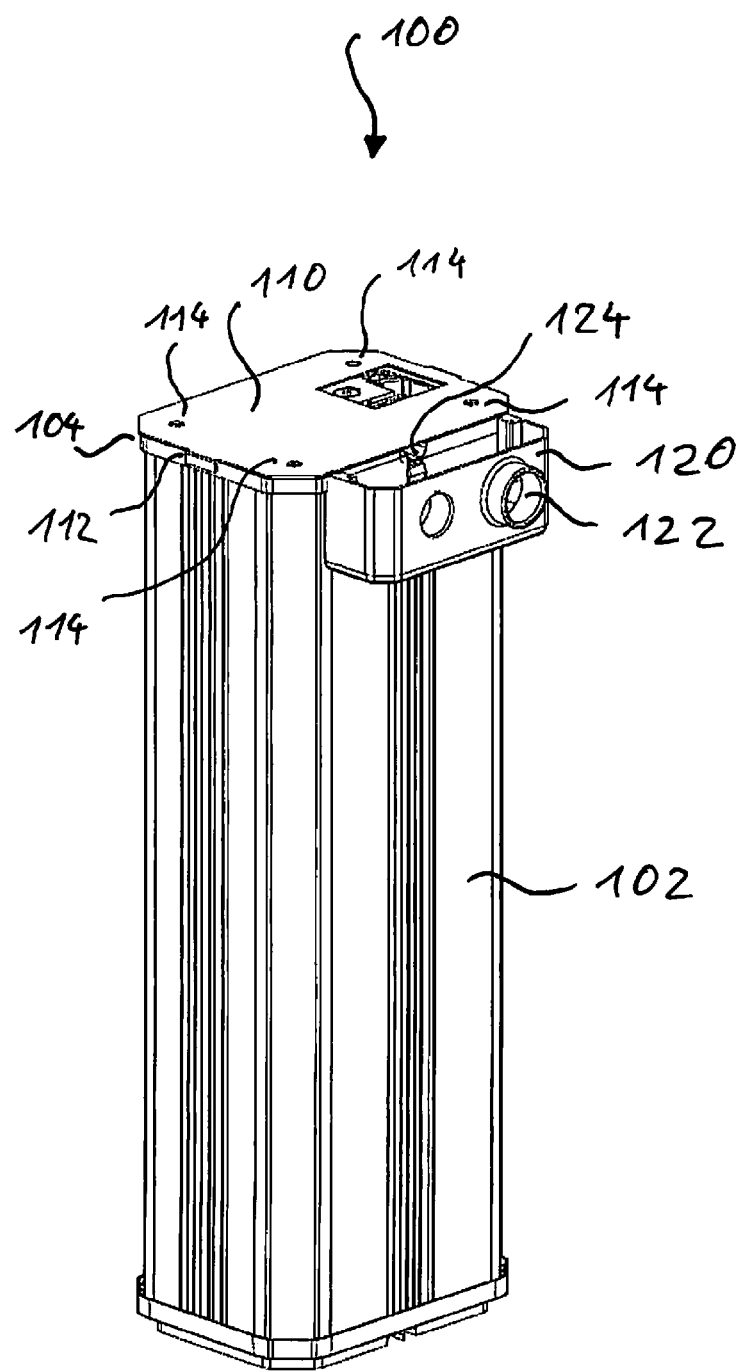
FIG. 1 shows a schematic three-dimensional view of a device for providing an electrical or fluid junction after connection to a columnar component.

In the following, the same reference numerals can sometimes be used with various described exemplary embodiments for objects and functional units which have the same or similar functional properties. Furthermore, summarizing reference numerals may be used for components and objects that appear multiple times in an exemplary embodiment or in an illustration, but that are described together in terms of one or more common features. Components or objects that are described with the same or summarizing reference numerals can be embodied identically, but also optionally differently, in terms of individual, multiple, or all features, for example their dimensions, as long as the description does not explicitly or implicitly indicate otherwise. Furthermore, optional features of the different exemplary embodiments can be combinable or interchangeable with one another.

A fluid junction is a connection point for a fluid medium, i.e. a liquid or a gas such as water or air. In the following discussion, the exemplary embodiments are described in the context of a device for providing an electrical junction. However, it is clear that the embodiments provided can likewise be used in a corresponding manner for a device for providing a fluid junction. For example, the opening for routing an electrical line in the case of an electrical junction is an opening for routing a wire or cable or similar structure, and in the case of a fluid junction is, for example, an opening for routing a fluid line such as a pipe or a tube or a conduit for a liquid or a gas.

Figure 2:
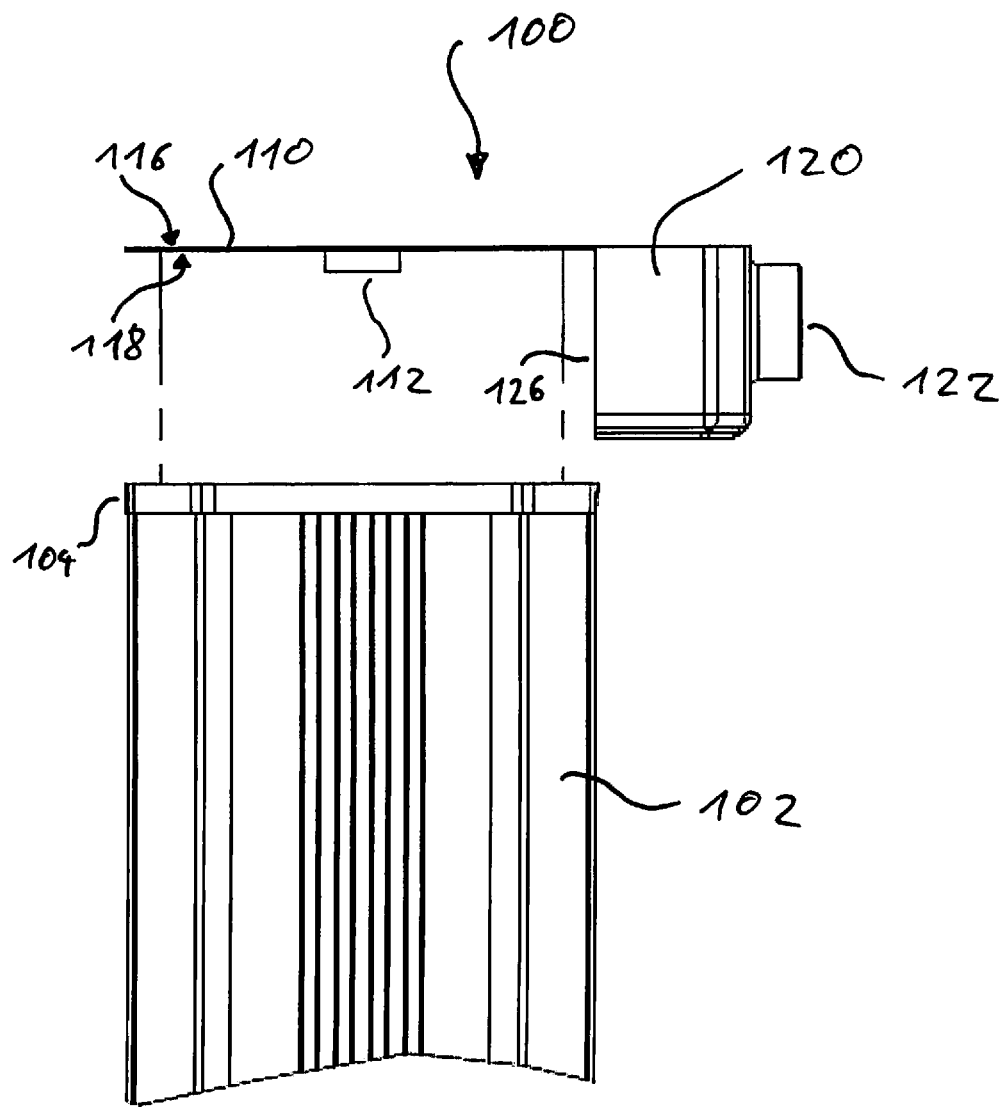
FIG. 2 shows a schematic side view of a device for providing an electrical junction and a columnar component prior to the connection.
Figure 3:
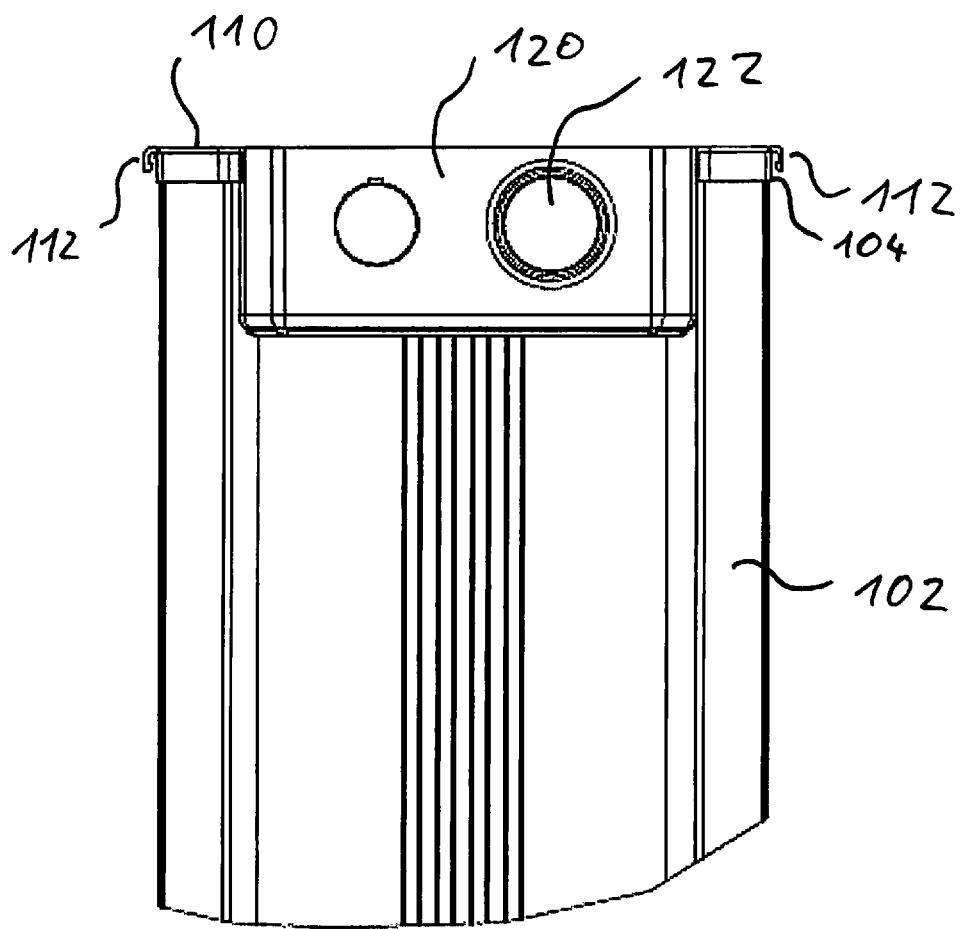
FIG. 3 shows a schematic side view of a device for providing an electrical junction and a columnar component after the connection.

FIGS. 1-3 show different views of a device 100 for providing an electrical junction according to an exemplary embodiment. The device 100 comprises a connecting structure 110 and a junction structure 120. The connecting structure 110 is connectable to an end of a columnar component 102 having a hollow profile. The junction structure 120 is connected to the connecting structure 110 and has at least one opening 122 for providing an electrical junction for an external plug and a further opening 124 for routing a cable from the electrical junction into the columnar component 102.

The device 100 is connectable to an end of the columnar component 102 via the connecting structure 110. This allows electrical junctions to be provided on the column in a simple manner without having to change or post-process the structure of the columnar component 102. The device 100 can be attached as an accessory to one or both ends of the columnar component 102. A cable pathway inside the column 102, which is not externally visible, allows a cable to be routed from opening 124 and an electrical junction in the junction structure 120 to the other end of the columnar component 102, and from there into a cable channel, a further component, or also simply a wall outlet. The device 100 can be connected to the columnar component 102 during or after manufacture of the columnar component 102, or also later by the user. Furthermore, any number and/or type of electrical junctions can be integrated into the junction structure 120, and this improves design flexibility.

The connecting structure 110 can be connected to the end of the columnar component 102 simply by placing or setting it onto the end part 104 of the columnar component 102, or generally onto the opening of the hollow profile and/or by the use of appropriate latching/locking connections or by the use of connectors such as screws, rivets, or nails.

A columnar component 102 having a hollow profile can be any type of elongated component, that is, a component having a significantly greater extension (more than twice, five times, ten times, or more) in one direction as in the other two directions, which columnar component 102 has a cavity extending between the two ends in its longitudinal direction. This cavity can have a constant cross-section between the two ends of the columnar component (e.g. square or rectangular), but can also have a variable cross-section (due to internal bracing/ribbing or other structural measures, for example). However, since at least one cable is to be routed into the interior, the cross-section of the cavity is larger than the diameter of a cable. The outer contour of a cross-section, orthogonal to the longitudinal axis, can vary over the length of the columnar component 102. For example, the cross section of an end of the columnar component 102 to be attached to the ground or floor can taper towards an opposite end. Alternately, the basic shape of the columnar component 102 may vary, for example, from a square cross section at one end, to a round cross-section in the center, and back to a square cross-section at its other end, depending on the use to which the columnar component will be put. The cross section can also be constant over a large part of the length of the columnar component 102 (e.g. more than half of the length, more than 80% of the length, or more) so that the columnar component 102 can be manufactured inexpensively.

The junction structure 120 has at least two openings 122, 124. The first opening 122 provides an electrical junction for an external plug. That is, the first opening 122 is designed to accommodate a junction appropriate for holding the particular plug. Here the size and shape of the first opening 122 can vary depending on the type of plug or the desired electrical junction. The second opening 124 is provided for routing at least one cable which extends from the electrical junction into the columnar component 102, and can subsequently be further guided in the columnar component 102. The second opening 124 can have a different shape and size than the first opening 122. The size of the second opening 124 can, for example, be based on the number of electrical junctions provided and on the type of junctions, as well as on the connecting cables needed therefor.

The junction structure 120 represents a type of housing, in which externally accessible electrical junctions are housed, whose cables can be routed via an additional opening 124 at the columnar component 102. For this purpose, the first opening 122 for providing an electrical junction and the second opening 124 for routing a cable can be disposed on two different sides of the junction structure 120 (e.g. on two opposing sides).

FIGS. 1-3 show a detailed example of a device for providing an electrical junction, which example shows many optional, alternative, or additional details, such as angled edges 112 of the connecting structure 110, holes 114 in the connecting structure 110, an additional opening for a further electrical junction, the exact form of the connecting structure 110 and of the junction structure 120, or also details of the profile columnar component 102. These details are provided for the purpose of illustrating various modifications to a basic design and should not be interpreted as limiting the generality of the described concept.

The electrical junction and the cable routed in the columnar component 102 can be installed by an end user after the columnar component 102 is manufactured. The user can therefore determine the type of electrical or other junction that is needed, and install it without modifying the physical structure of the columnar structure 102 itself. Alternatively, one or more electrical junctions, with or without associated cables, can be installed by the manufacturer of the columnar component 102 in the openings of the device 100 for providing an electrical junction, and thus can be part of the device 100. Likewise, the device 100 can already be connected to the columnar component 102, so that the columnar component 102 can also be part of the device 100, and the entire device can be delivered to the user as a completed columnar component having at least one electrical junction. Alternatively, the user can also retrofit existing systems with such a device 100 for providing an electrical junction.

The electrical junction may comprise, for example and without limitation, a power supply connector, a network connector, a control connector, an output, an input, a junction device in general, a power supply plug of an additional accessory, or a telephone connector.

The connecting structure 110 may be substantially plate-shaped. Here "plate-shaped" should be understood to mean a structure, which is substantially larger (more than two times, more than five times, more than ten times as large or more) in two directions of extension than in its third direction of extension, the third direction constituting the thickness of the plate. Furthermore, the plate-shaped structure can have a substantially constant thickness (except for manufacturing and measuring tolerances). For example, a structure is substantially plate-shaped if the plate-shaped structure can also have recesses and holes, or structures at the edges of the plate-shaped part which deviate from the plate shape. The connecting structure IV) can be the same thickness as, but also significantly thinner than (less than half as thick, less than a quarter as thick, or less than a tenth as thick) an extension of the junction structure 120 in the direction of the longitudinal axis of the columnar component 102. In other words, the connecting structure 110 may be end flush with the junction structure 120 on both sides, or only end flush with the junction structure 120 on the side facing away from the columnar component. The connecting structure 110 can also have the same shape as the columnar component 102.

The edges 112 of the connecting structure 110 can optionally or additionally be at least partially angled to help hold the device 100 in position at the end of the columnar component 102, at least in one direction of movement (parallel to the plane of the plate), if the device 100 is connected to the columnar component 102 via the connecting structure 110.

The connecting structure 110 may be connected to the junction structure 120 via a part of the edge of the plate. The connection can for example be a rigid connection so that forces can be transmitted in all directions from the junction structure 120 to the connecting structure 110 and vice versa.

In order to provide an open installation space for components to be attached to the columnar structure 102, the junction structure 120 may extend only to one side of the plate plane 116 of the connecting structure 110. In this way no part of the device 100 protrudes on the other side of the plate plane 116 where such an additional component might be mounted. In other words, the junction structure 120 can be formed such that it only protrudes out on one side through the plane formed by the plate of the connecting structure 110, and the other side remains free. In this way components to be carried or supported, such as for example a tabletop, can be mounted on the end of the column-shaped component 102 connected to the device 100, without the junction structure 120 being in the way.

Additionally or optionally, the junction structure 120 can have a side surface 126, which forms an angle of between 80 degrees and 100 degrees, e.g., 90 degrees, with one of the plate sides 118 of the connecting structure 110. In this way an L-shaped profile can be formed by the connecting structure 110 and the side surface 126 of the junction structure 120. Upon connection with the columnar component 102, the plate-shaped connecting structure 110 can then at least partially cover the opening of the hollow profile of the columnar component 102, and the side surface 126 of the junction structure 120 can abut on a side surface of the columnar component 102, so that the junction structure 120 is stably attached to the columnar component 102 even when loaded by connected external plugs.

As mentioned above, the connecting structure 110 can at least partially cover the opening of the hollow profile of the columnar component 102 at the end of the columnar component 102. In this respect, in the installed state the connecting structure 110 can be an intermediate piece between the columnar component 102 and a component to be carried/supported by the columnar component 102. Here the connecting structure 110 can have a contour which corresponds substantially to a cross-section of the columnar component 102, in order to be able to be used, in the installed state, as an intermediate piece. "Contour" means here for example the geometry or shape of the outer edges of the plate in a plate-shaped connecting structure 110. For example, the contour of the connecting structure 110 can be substantially rectangular if the columnar component 102 has a substantially rectangular cross-section. In the example of FIG. 1, an embodiment is shown in which a plate-shaped connecting structure 110 has a substantially rectangular contour with chamfered edges, which contour matches and fits with the substantially rectangular cross-section of the columnar component 102, the cross-section of which also has chamfered edges. Here for example, "contour which substantially corresponds to a cross-section" means that the contour of the connecting structure 110 has a maximum difference from the outer cross-section of the columnar component 102 which is less than 10% (or 20%, 5%, or less) of a maximal cross-section width of the columnar component 102.

Optionally or additionally, the connecting structure 110 can have holes 114 that allow a component that is supported by the columnar component 102 to be connected thereto using connectors inserted through the holes 114 in the connecting structure 110. Screws, rivets, or nails can be used for example as the connectors.

The connecting structure 110 and the junction structure 120 can be manufactured from the same material or from different materials. For example, the connecting structure 110 and the junction structure 120 can be formed from a one-piece plastic part. Alternatively, the connecting structure 110 can, for example, be a punched or stamped metal plate, and the junction structure 120 can be a plastic part connected to the metal plate.

The columnar component 102 may be a metal hollow profile, formed from aluminum, for example, or a plastic hollow profile. Optionally or additionally, the hollow profile can have an end part 104 (e.g. made from plastic), which simplifies or makes possible the routing of cables or the arrangement of electrical or circuit boards in the hollow profile of the columnar component 102, as is shown e.g. in FIGS. 1-3, or cover a sharp-edged end of the hollow profile. The device 100 can be connected via the connecting structure 110 directly to the hollow profile or to the end part 104 of the columnar component 102.

Some exemplary embodiments are directed to a lifting column including a device for providing an electrical junction according to the above-described concept. The lifting column corresponds here to the columnar component 102 having a hollow profile, and the device 100 is connected via the connecting structure 110 to an end of the lifting column so that the junction structure 120 is located at a side surface of the lifting column and extends towards the other end of the lifting column, as is also shown in the example in FIGS. 1-3.

Lifting columns generally comprise at least two tube-shaped or columnar components which are insertable one-into-another along a direction of movement and are thus movable. In this way the length of the lifting column can be adjusted manually or electrically. The height above the ground of one of the components supported by the lifting column (e.g. a table top or a patient bed) can be changed by changing the length of the lifting column. The lifting column can be used, for example, for laboratory tables, patient beds, wheelchairs, or generally for applications wherein the position of an object should be changeable. The lifting column can optionally or additionally have an electrical board in its interior, and the electrical junction in the opening 122 of the junction structure 120 can be connected via a cable to the board in the lifting column.

Optionally, additionally, or alternatively, the length of the lifting column can be electrically adjustable, and the electrical junction can be a control junction for electrically adjusting the length of the lifting column. For example, a control panel or a remote control panel can be plugged into the electrical junction so that a user can change the length of the lifting column via the control panel or the remote control.

Some exemplary embodiments relate to a junction device which includes a junction for an IEC, RJ45, or other plug which can be added to a column without the column having to be post-processed or modified.

This junction device can be mounted on the upper and/or lower plate of a column. The junctions can be placed in such a manner that they are accessible from the side of the column.

Since the junction device may be provided as a separate structure that can be added to a column after manufacture, the column can be manufactured as a standard product without making modifications based on the type of junction that might eventually be attached thereto. The junction device can be added at the end of the production line or even by the end user. Even if the user recognizes only after ordering the column that junctions (which are accessible from the side) are required, the junctions can later be added as an accessory. The accessory can also be added only on one end of the column or on both ends, which makes the design of the column very flexible.

The features disclosed in the foregoing description, in the claims that follow, and in the drawings can be relevant individually, as well as in any combination, to the realization of the invention in its various embodiments.

Although some aspects of the present invention have been described in the context of a device, it is to be understood that these aspects also represent a description of a corresponding method, so that a block or a component of a device is also understood as a corresponding method step or as a feature of a method step. In an analogous manner, aspects which have been described in the context of or as a method step also represent a description of a corresponding block or detail or feature of a corresponding device.

The above-described exemplary embodiments represent only an illustration of the principles of the present invention. It is understood that modifications and variations of the arrangements and details described herein will be clear to other persons of skill in the art. It is therefore intended that the invention be limited only by the scope of the following patent claims, and not by the specific details which have been presented with reference to the description and the explanation of the exemplary embodiments.

REFERENCE NUMBER LIST

100 Device for providing an electrical or fluid junction
102 Columnar component
104 End part
110 Connecting structure
112 Angled edge
114 Holes
116 A plate plane facing away from the columnar component
118 A plate side facing away from the plate plane
120 Junction structure
122 Opening for providing an electrical or fluid junction
124 Opening for routing a line/conduit/wire
126 Side surface of the junction structure

What is claimed is:

1. A device for providing an electrical or fluid junction, comprising:
   a connecting structure configured to be connectable to an end of a columnar component having a hollow profile, wherein the connecting structure comprises a plate that is configured to be coupled with the end of the columnar component; and
   a junction structure connected directly to the plate and having at least one opening for providing an electrical or fluid junction for an external plug and a further opening for routing a line from the electrical or fluid junction into the columnar component,
   wherein the junction structure is disposed to one side of the plate, such that the plate is connectable to the columnar component without the junction structure being in between the plate and the columnar component, and the plate is not between the junction structure and the columnar component when the plate is connected to the end of the columnar component.

2. The device according to claim 1, wherein:
   the plate has a first side lying in a plane, and a second side that is configured to face the end of the columnar component,
   the junction structure extends from an edge of the plate, the edge extending between the first and second sides of the plate, and
   both the second side of the plate and the junction structure lie entirely on a first side of the plane.

3. The device according to claim 2, wherein the junction structure has a side surface which forms an angle between 80° and 100° with the plane.

4. The device according to claim 1, wherein the connecting structure has at least partially angled edges configured to hold the device at the end of the columnar component in at least one direction of movement by the angled edges.

5. The device according to claim 1, wherein the connecting structure and the junction structure are formed as a one-piece plastic part.

6. The device according to claim 1, wherein the connecting structure has a contour which substantially corresponds to a cross-section of the columnar component.

7. The device according to claim 1, wherein the connecting structure has holes for securing a component to be supported on the column to the connecting structure.

8. A lifting column including a device for providing an electrical or fluid junction according to claim 1, wherein the lifting column comprises the columnar component, and the device is connected via the connecting structure to an end of the lifting column such that the junction structure is located on a side surface of the lifting column and extends towards the other end of the lifting column.

9. The device according to claim 2, wherein the junction structure has a side surface which forms a 90° angle with the plane.

10. The device according to claim 1, wherein the plate is a stamped metal plate and the junction structure is a plastic part connected to the metal plate.

11. The device according to claim 1, wherein the plate has a first side lying in a plane, wherein the junction structure is connected at an edge of the plate and lies entirely on a first side of the plane, the edge of the plate meeting the first side of the plate, wherein the junction structure has a side surface which forms an angle between 80° and 100° with the plane, and wherein the connecting structure has at least partially angled edges configured to hold the device at the end of the columnar component in at least one direction of movement.

12. The device according to claim 1, wherein the plate has a first side lying in a plane and the junction structure comprises a housing connected to the plate and disposed entirely on the first side of the plane.

13. The device of claim 1, wherein the plate is configured to abut the end of the columnar component.

14. The device of claim 1, wherein the at least one opening and the further opening are defined in opposite sides of the junction structure.

15. The device of claim 1, wherein the plate and a side of the junction structure meet and form an L-shape.

16. A lifting column comprising:
a columnar component having a central longitudinal axis, a hollow interior, a plurality of sidewalls extending along the longitudinal axis, an open end and a second end, opposite to the open end;
a plate having a first surface lying in a plane perpendicular to the longitudinal axis and mounted at and at least partially covering the open end of a columnar component; and
a housing connected directly to the plate and disposed entirely on a first side of the plane and extending from the plane toward the second end of the columnar component, such that the housing extends from the plate in a direction parallel to the central longitudinal axis, such that at least one of the plurality of sidewalls is positioned between the central longitudinal axis and an entirety of the housing, in a direction perpendicular to the central longitudinal axis, the housing having a first opening configured for mounting an electrical or fluid junction and a second opening spaced from the first opening providing a pathway from outside the columnar component to the interior for routing a line from the electrical or fluid junction to the interior, wherein the plate is connected to the columnar component without the housing being disposed therebetween.

17. The lifting column according to claim 16, wherein the housing comprises first and second wall portions projecting from the sidewall and a mounting wall including the first opening connected to the first and second wall portions such that the mounting wall is spaced from the columnar component.

18. The lifting column according to claim 17, wherein the second opening is located at a joining of the plate and the housing.

* * * * *